United States Patent
Akama

(10) Patent No.: US 8,195,222 B2
(45) Date of Patent: *Jun. 5, 2012

(54) SHARED PHONE, MEDIUM HAVING RECORDED THEREIN PROGRAM FOR CONTROLLING SHARED PHONE, AND METHOD FOR CONTROLLING SHARED PHONE

(75) Inventor: Katsuaki Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/871,896

(22) Filed: Aug. 30, 2010

(65) Prior Publication Data

US 2010/0323721 A1 Dec. 23, 2010

Related U.S. Application Data

(63) Continuation of application No. 11/211,750, filed on Aug. 25, 2005, now Pat. No. 7,792,543.

(30) Foreign Application Priority Data

May 19, 2005 (JP) ................................ 2005-146303

(51) Int. Cl.
 *H04W 4/00* (2009.01)
 *H04B 7/00* (2006.01)
 *H04M 1/00* (2006.01)
(52) U.S. Cl. .................. 455/550.1; 455/435.1; 455/463; 455/507; 455/552.1
(58) Field of Classification Search ........ 455/41.2–41.3, 455/426.1, 435.1–435.2, 456.1–456.6, 552.1–558, 455/462, 463, 465, 507, 517
See application file for complete search history.

(56) References Cited

U.S. PATENT DOCUMENTS 6,122,502 A * 9/2000 Grundvig et al. .......... 455/414.1
(Continued)

FOREIGN PATENT DOCUMENTS

JP 10-42370 2/1998
(Continued)

OTHER PUBLICATIONS

JPO—Japan Patent Office, Office Action mailed Jul. 6, 2010, in connection with corresponding JP Patent Application No. 2005-146303, with English-language translation.

(Continued)

*Primary Examiner* — Simon Nguyen
(74) *Attorney, Agent, or Firm* — Fujitsu Patent Center

(57) ABSTRACT

The present invention provides a shared phone, a medium having recorded therein a program for controlling the shared phone, and a method for controlling the shared phone, which can make the shared use by a plurality of users easy. The shared phone switches phone numbers depending on users, and includes a user information storage unit that stores user information including phone numbers for each user, a public line communication unit that performs public line communication, and registers phone numbers stored in the user information storage unit to a public line, and detects an incoming call to a registered phone number, a display unit that, in case an incoming call is detected by the public line communication unit, displays user information corresponding to the incoming call from among user information stored by the user information storage unit, and an operation unit that accepts instruction for public line communication from a user, and sends the instruction to the public line communication unit.

4 Claims, 5 Drawing Sheets

U.S. PATENT DOCUMENTS

| | | | |
|---|---|---|---|
| 6,671,506 B1 * | 12/2003 | Lee | 455/406 |
| 6,836,652 B2 | 12/2004 | Arima et al. | |
| 7,373,103 B2 * | 5/2008 | Sato et al. | 455/7 |
| 2004/0014464 A1 * | 1/2004 | Takatori et al. | 455/422.1 |
| 2004/0132500 A1 * | 7/2004 | Rogalski et al. | 455/569.1 |
| 2005/0070272 A1 * | 3/2005 | Marangos | 455/426.2 |
| 2005/0176446 A1 * | 8/2005 | Kobayashi et al. | 455/462 |
| 2006/0234693 A1 * | 10/2006 | Isidore et al. | 455/422.1 |

FOREIGN PATENT DOCUMENTS

| | | |
|---|---|---|
| JP | 10-290294 | 10/1998 |
| JP | 2002-111810 | 4/2002 |
| JP | 2003-189361 | 7/2003 |
| JP | 2004-193641 | 7/2003 |
| PX | 11-41347 | 2/1999 |

OTHER PUBLICATIONS

JPO—Japan Patent Office, Office Action mailed May 12, 2009, in connection with corresponding JP Patent Application No. 2005-146303, with partial English-language translation.
U.S. Appl. No. 11/211,750, filed Aug. 25, 2005.
Aug. 9, 2010, Supplemental Notice of Allowability.
Apr. 30, 2010, Notice of Allowance (Includes Examiner—s Statement on Reasons for Allowance dated Apr. 23, 2010).
Sep. 25, 2009, Final Rejection.
Jan. 2, 2009, Non-Final Rejection.
Oct. 27, 2008, Advisory Action.
Jul. 17, 2008, Final Rejection.
Jan. 22, 2008, Non-Final Rejection.

* cited by examiner

SHARED PHONE, MEDIUM HAVING RECORDED THEREIN PROGRAM FOR CONTROLLING SHARED PHONE, AND METHOD FOR CONTROLLING SHARED PHONE

BACKGROUND OF THE INVENTION

1. Field of the Invention

The present invention relates to a shared phone that is shared by plural users, in which plural phone numbers are registered.

2. Description of Related Art

Recently, as cellular phones are widely diffused, there are many phone users who use both a company-owned cellular phone and a personal cellular phone. On the other hand, it is troublesome for an individual phone user to carry about plural cellular phones and make full use of both the company-owned cellular phone and personal cellular phone. Furthermore, it costs a great deal for a company to allocate company-owned cellular phones to all the individuals.

As a related art relevant to the present invention, there is known a patent document 1 disclosed in JP. Pat. Application. Laid-Open Publication No. 2002-111810. In the patent document 1, there is disclosed a compound cellular phone that has a plurality of reception/transmission units, and phone numbers are assigned to the respective reception/transmission units, which makes it possible to use a single cellular phone for both personal use and business use.

SUMMARY OF THE INVENTION

However, when it is attempted to reduce the number of company-owned cellular phones and allocate a cellular phone to plural employees, it becomes unclear who uses the cellular phone and whom an incoming call to the cellular phone is directed to, which makes the cellular phone inconvenient.

It is therefore an object of the present invention to overcome the above-mentioned drawbacks by providing a shared phone, a medium having recorded therein a program for controlling the shared phone, and a method for controlling the shared phone, which can make the shared use by a plurality of users easy.

According to the present invention, there is provided a shared phone that switches phone numbers depending on users, including: a user information storage unit that stores user information including phone numbers for each user; a public line communication unit that performs public line communication, and registers phone numbers stored in the user information storage unit to a public line, and detects an incoming call to a registered phone number; a display unit that, in case an incoming call is detected by the public line communication unit, displays user information corresponding to the incoming call from among user information stored by the user information storage unit; and an operation unit that accepts instruction for public line communication from a user, and sends the instruction to the public line communication unit.

According to the shared phone of the present invention, in case of originating a call to the public line, the display unit displays user information stored by the user information storage unit, the operation unit accepts, from a user, selection of user information of the origination source and input of information of the origination destination from among the user information, and the public line communication unit originates a call using the public line in accordance with information of the origination source and of the destination acquired from the operation unit.

The shared phone further includes, an intra-area radio communication unit that performs radio communication with a radio communication device that has stored therein the user information in advance, wherein the intra-area radio communication unit detects the radio communication device located in a predetermined area, and takes in the user information from thus detected radio communication device by way of radio communication, and makes the user information storage unit store the user information.

According to the shared phone of the present invention, in case radio communication with the detected radio communication device is cut off, the intra-area radio communication unit deletes user information stored in the user information storage unit.

According to the shared phone of the present invention, the shared phone is a cellular phone.

According to the present invention, there is provided a medium that has recorded therein, readably by a computer, a shared phone control program that makes a shared phone computer perform control for a shared phone that switches phone numbers depending on users, the shared phone control program making a computer perform the steps including: a user information storage step that stores user information including phone numbers for each user; a phone number registration step that registers phone numbers stored in the user information storage step to a public line; an incoming call detection step that detects an incoming call from the public line; a display step that, in case an incoming call to the phone number is detected in the incoming call detection step, displays user information corresponding to the incoming call from among user information stored in the user information storage step; an operation step that accepts instruction for public line communication from a user; and a public line communication step that performs public line communication in accordance with the instruction acquired in the operation step.

According to the medium that has recorded therein a shared phone control program, in case of originating a call to the public line, the display step displays user information stored in the user information storage step, and the operation step accepts, from a user, selection of user information of the origination source and input of information of the destination from among the user information, and the public line communication step originates a call using the public line in accordance with information of the origination source and of the destination acquired in the operation step.

The medium that has recorded therein a shared phone control program, prior to the user information storage step, makes a computer perform a user information take-in step that detects a radio communication device which has stored therein the user information in advance in a predetermined area, and takes in the user information from thus detected radio communication device by way of radio communication, and makes the user information storage step store the user information.

The medium that has recorded therein a shared phone control program, in case radio communication with the detected radio communication device is cut off, further performs a user information deletion step that deletes user information stored in the user information storage step.

According to the present invention, there is provided a method for controlling a shared phone that performs control for a shared phone that switches phone numbers depending on users, the method performing the steps including: a user information storage step that stores user information including phone numbers for each user; a phone number registration step that registers phone numbers stored in the user information storage step to a public line; an incoming call detection step that detects an incoming call from the public line; a display step that, in case an incoming call to the phone number is detected in the incoming call detection step, displays user information corresponding to the incoming call from among user information stored in the user information storage step; an operation step that accepts instruction for public line communication from a user; and a public line communication step that performs public line communication in accordance with the instruction acquired in the operation step.

According to the present invention, there is provided a method for controlling a shared phone that performs control for a shared phone that switches phone numbers depending on users who carry about a radio communication device, the method performing the steps including: a user information transmission step that, in the radio communication device, stores user information including phone numbers in advance, and transmits the user information to the shared phone; a user information take-in step that, in the shared phone, detects the radio communication device located in a predetermined area, and takes in the user information from thus detected radio communication device by way of radio communication; a user information storage step that, in the shared phone, stores user information taken in by a radio communication step in the area; a phone number registration step that, in the shared phone, registers phone numbers stored in the user information storage step to a public line; an incoming call detection step that, in the shared phone, detects an incoming call from the public line; a display step that, in the shared phone, in case an incoming call to the phone number is detected in the incoming call detection step, displays user information corresponding to the incoming call from among user information stored in the user information storage step; an operation step that, in the shared phone, accepts instruction for public line communication from a user; and a public line communication step that, in the shared phone, performs public line communication in accordance with the instruction acquired in the operation step.

According to the method for controlling a shared phone, in case of originating a call to the public line, the display step displays user information stored in the user information storage step, and the operation step accepts, from a user, selection of user information of the origination source and input of information of the destination from among the user information, and the public line communication step originates a call using the public line in accordance with information of the origination source and of the destination acquired in the operation step.

The method for controlling a shared phone, in case radio communication with the detected radio communication device is cut off, further performs a user information deletion step that deletes user information stored in the user information storage step.

According to the present invention, a plurality of users can use the shared phone using their respective phone numbers. The shared phone displays information of the origination source and of the destination, which can facilitate the shared use by a plurality of users. Since a radio communication device such as a personal cellular phone having stored therein user information and a shared phone carry out short-range radio communication, when a user carrying about the radio communication device comes close to the shared phone, the user comes to be able to use the shared phone easily. In case the shared phone is a shared cellular phone, when a first user who used the shared cellular phone up to then hands over the shared cellular phone to a second user who will use the shared cellular phone next, and the first user gets away from the shared cellular phone, the second user comes to be able to use the shared cellular phone with the second user's phone number.

DETAILED DESCRIPTION OF THE PREFERRED EMBODIMENTS

An embodiment according to the present invention will further be described below with reference to the accompanying drawings.

In the embodiment, as an example of a shared phone, a shared cellular phone will be explained.

Firstly, the configuration of a communication system using a shared cellular phone according to the present invention will be explained.

Figure 1:
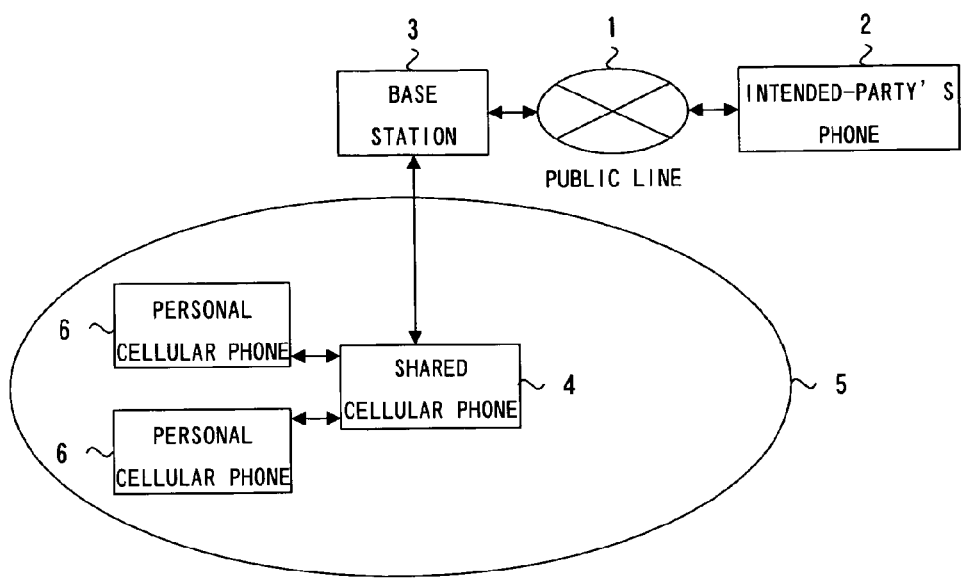
FIG. 1 shows a block diagram indicative of one example of the configuration of a communication system using a shared cellular phone according to the present invention.

FIG. 1 shows a block diagram indicative of one example of the configuration of a communication system using a shared cellular phone according to the present invention. In this communication system, there is arranged a public line 1, to which an intended-party's phone 2 and a base station 3 are connected. Furthermore, a shared cellular phone 4 is connected to the base station 3 through a radio line. The shared cellular phone 4 can perform communication with the public line 1 by way of radio communication, and in addition, can perform short-range radio communication by way of radio communication of another system. As shown in FIG. 1, when a personal cellular phone 6 is located in a short-range radio communication area 5 of the shared cellular phone 4, the personal cellular phone 6 and the shared cellular phone 4 can perform short-range radio communication.

Figure 2:
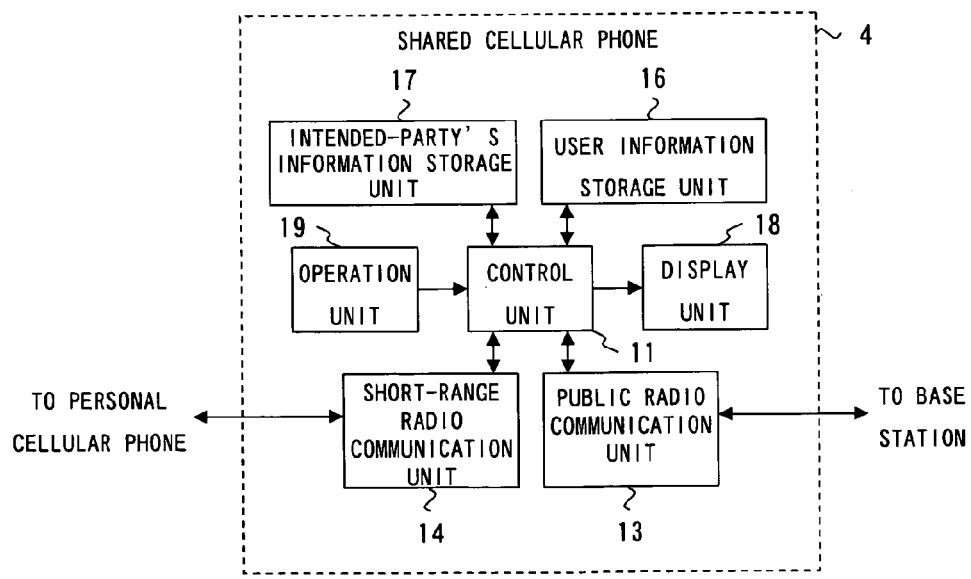
FIG. 2 shows a block diagram indicative of one example of the configuration of the shared cellular phone according to the present invention.

FIG. 2 shows a block diagram indicative of one example of the configuration of the shared cellular phone 4 according to the present invention. The shared cellular phone 4 includes a control unit 11 that controls a public radio communication unit 13, a short-range radio communication unit 14, a user information storage unit 16, and an intended-party's information storage unit 17. The user information storage unit 16 takes in and stores user information from the personal cellular phone 6, which information is that of each user of the personal cellular phone 6. The user information is a phone number that a corresponding user uses with the shared cellular phone 4, a user name for display, etc. The intended-party's information storage unit 17 has a function of an address book that stores intended-party's information which is information of an intended-party registered in advance. The intended-party's information is a phone number and a name of the intended-party. The public radio communication unit 13 performs radio communication with the base station 3 to make a connection to the public line 1 using a phone number. The short-range radio communication unit 14 makes a connection to the personal cellular phone 6 located in the short-range radio communication area 5 by way of radio communication. The shared cellular phone 4 further includes a display unit 18 that displays information sent from the control unit 11, and an operation unit 19 that sends operation of a user to the control unit 11. The short-range radio communication area 5 is an area in which the short-range radio communication unit 14 can perform radio communication.

Figure 3:
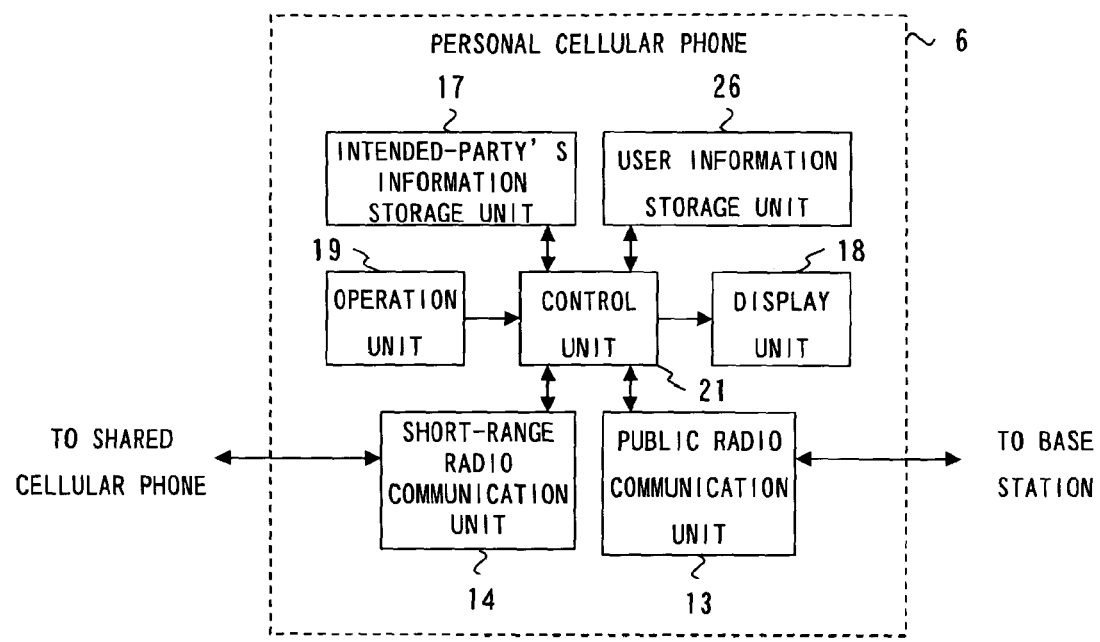
FIG. 3 shows a block diagram indicative of one example of the configuration of a personal cellular phone according to the present invention.

FIG. 3 shows a block diagram indicative of one example of the configuration of the personal cellular phone 6 according to the present invention. In FIG. 3, parts or components similar to those shown in FIG. 2 are indicated with the same reference numerals, and detailed explanation of which will be omitted. Different from the shared cellular phone 4, the personal cellular phone 6 includes a control unit 21 instead of the control unit 11, and a user information storage unit 26 instead of the user information storage unit 16. The control unit 21 controls the public radio communication unit 13, short-range radio communication unit 14, user information storage unit 26, and intended-party's information storage unit 17. The user information storage unit 26 stores a phone number that the user of the personal cellular phone 6 uses with the shared cellular phone 4 in advance.

Next, the operation of the shared cellular phone 4 according to the present invention will be explained.

Figure 4:
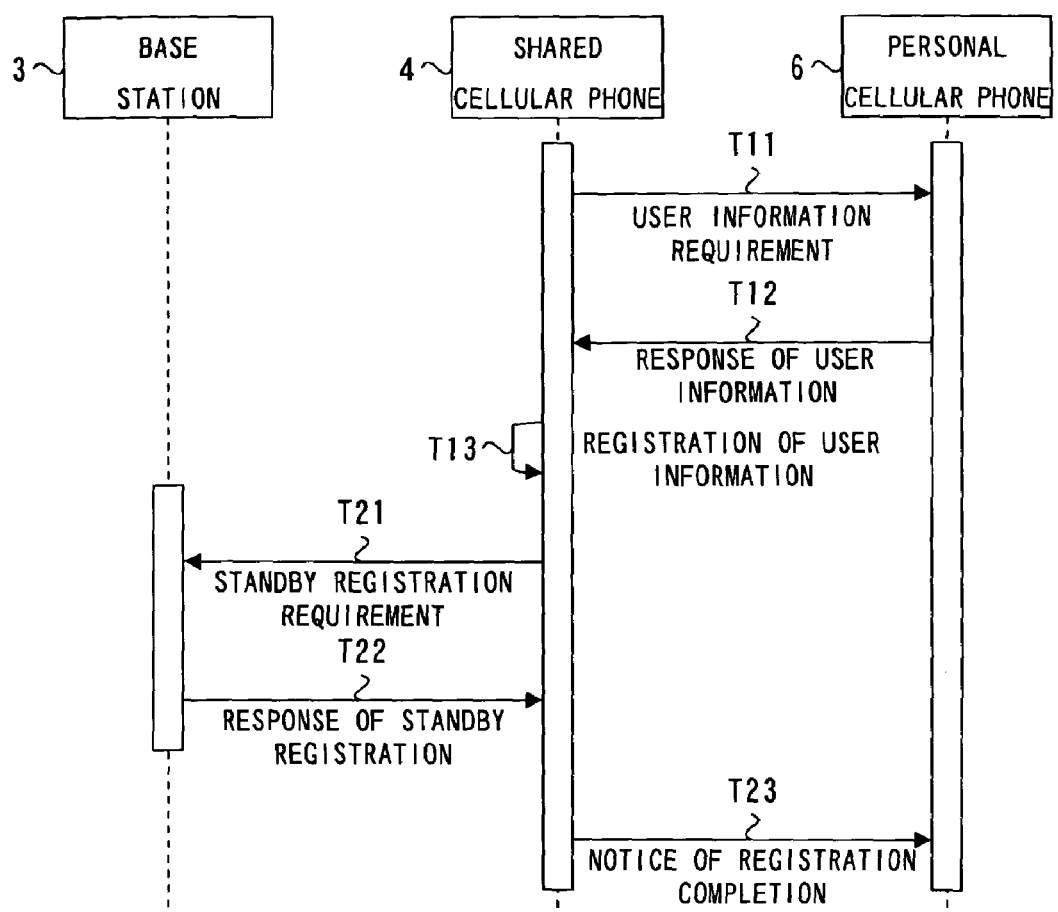
FIG. 4 shows a sequence diagram indicative of one example of the operation of registering the personal cellular phone by the shared cellular phone according to the present invention.

FIG. 4 shows a sequence diagram indicative of one example of the operation of registering the personal cellular phone 6 by the shared cellular phone 4 according to the present invention. In the shared cellular phone 4, the short-range radio communication unit 14 periodically detects the personal cellular phone 6 located in the short-range radio communication area 5, and when the session of short-range radio communication with the personal cellular phone 6 is established, this sequence is started.

In the shared cellular phone 4, the control unit 11 transmits user information requirement from the short-range radio communication unit 14 to the personal cellular phone 6 (T11). The user information includes a phone number that the user of the personal cellular phone 6 uses with the shared cellular phone 4. Next, in the personal cellular phone 6, when the short-range radio communication unit 14 receives the user information requirement, the control unit 21 takes in user information from the user information storage unit 26, and transmits the user information from the short-range radio communication unit 14 to the shared cellular phone 4 as a response (T12). Next, in the shared cellular phone 4, when receiving the user information, the control unit 11 registers the user information to the user information storage unit 16 (T13).

Next, in the shared cellular phone 4, the control unit 11 transmits standby registration requirement with a phone number registered in the user information storage unit 16 from the public radio communication unit 13 to the base station 3 (T21). Then, the base station 3 performs standby registration so that origination to the required phone number comes into the shared cellular phone 4, and transmits a response to the shared cellular phone 4 (T22). Next, in the shared cellular phone 4, when the public radio communication unit 13 receives the response of the standby registration, the control unit 11 transmits a notice of registration completion from the short-range radio communication unit 14 to the personal cellular phone 6 (T23), and the sequence is ended.

When the above-described registration is carried out every time the personal cellular phone 6 enters into the short-range radio communication area 5, a plurality of personal cellular phones 6 can be registered.

Figure 5:
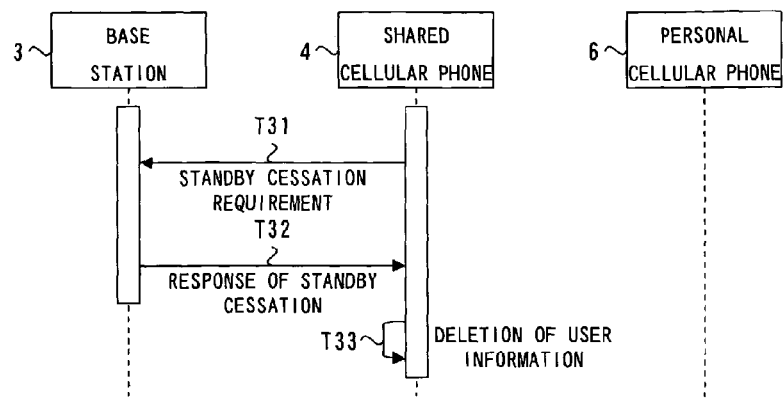
FIG. 5 shows a sequence diagram indicative of one example of the operation of deleting registration of the personal cellular phone by the shared cellular phone according to the present invention.

FIG. 5 shows a sequence diagram indicative of one example of the operation of deleting registration of the personal cellular phone 6 by the shared cellular phone 4 according to the present invention. In the shared cellular phone 4, when the session of short-range radio communication with the personal cellular phone 6 is cut off, this sequence is started. When the personal cellular phone 6 goes out of the short-range radio communication area 5, the session is cut off.

In the shared cellular phone 4, the control unit 11 transmits standby cessation requirement with a phone number corresponding to the personal cellular phone 6 whose session is cut off from the public radio communication unit 13 to the base station 3 (T31). Then, the base station 3 performs standby cessation, and transmits a response of the standby cessation to the shared cellular phone 4 (T32). Next, in the shared cellular phone 4, when the public radio communication unit 13 receives the response of the standby cessation, the control unit 11 deletes user information that underwent the standby cessation from the user information storage unit 16 (T33), and the sequence is ended.

Figure 6:
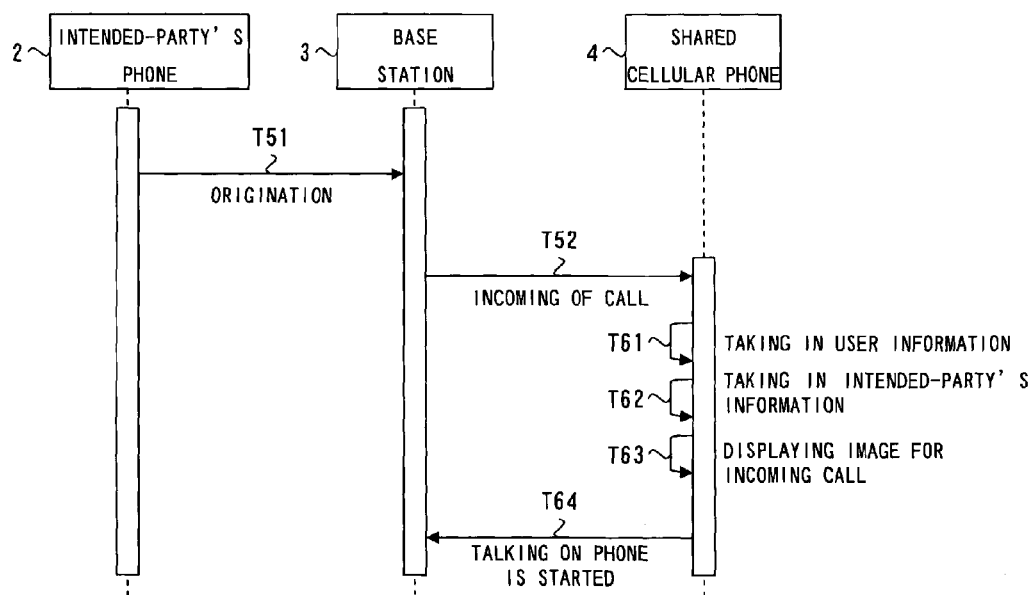
FIG. 6 shows a sequence diagram indicative of one example of the operation of receiving an incoming call by the shared cellular phone according to the present invention.

FIG. 6 shows a sequence diagram indicative of one example of the operation of receiving an incoming call by the shared cellular phone 4 according to the present invention. When the intended-party's phone 2 originates a call to one of phone numbers registered in the shared cellular phone 4, this sequence is started.

Firstly, the intended-party's phone 2 notifies the base station 3 of origination to one of phone numbers registered in the shared cellular phone 4 (T51). Next, the base station 3 notifies the shared cellular phone 4 of incoming of a call (T52). Next, in the shared cellular phone 4, when the public radio communication unit 13 receives an incoming call, the control unit 11 takes in user information of a user corresponding to the destination from the user information storage unit 16 (T61). Next, in the shared cellular phone 4, the control unit 11 takes in intended-party's information corresponding to the source of origination, if any, from the intended-party's information storage unit 17 (T62).

Next, in the shared cellular phone 4, the control unit 11 makes the display unit 18 display intended-party's information of the origination source and user information of the destination (T63). At this time, for example, the display unit 18 displays "A phone call from Mr. OO to Mr. XX". The part "Mr. OO" is intended-party's information of the origination source, which is a name or a phone number stored in the intended-party's information storage unit 17. On the other hand, the part "Mr. XX" is user information of the destination, which is a name or a phone number stored in the user information storage unit 16. Next, in the shared cellular phone 4, when the user performs the off-hook operation by means of the operation unit 19, the control unit 11 notifies the base station 3 of the off-hook operation from the public radio communication unit 13, and talking on the phone is started (T64), and the sequence is ended.

Figure 7:
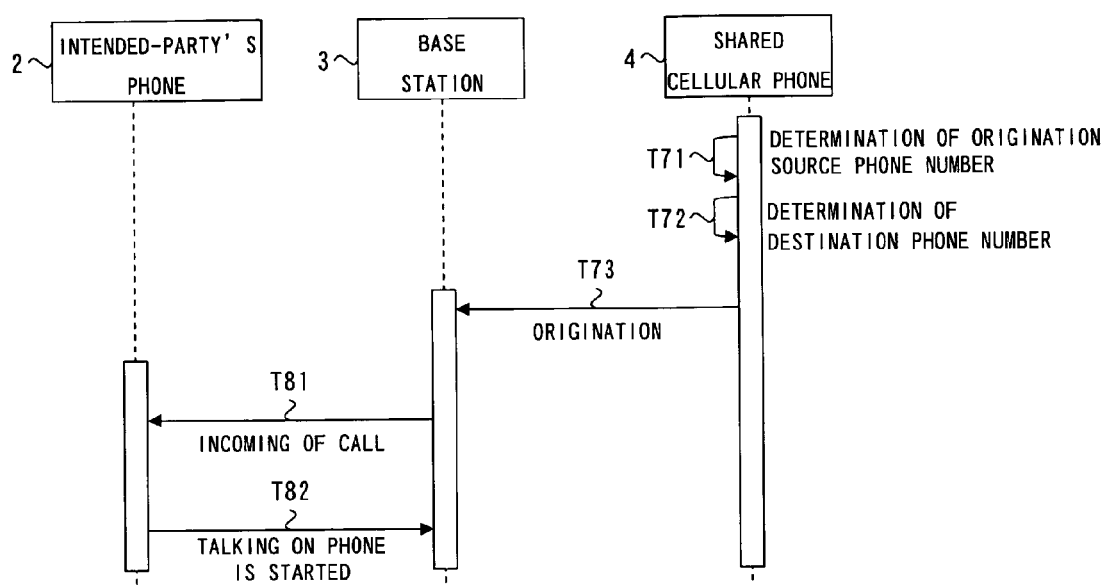
FIG. 7 shows a sequence diagram indicative of one example of the operation of origination from the shared cellular phone according to the present invention.

FIG. 7 shows a sequence diagram indicative of one example of the operation of origination from the shared cellular phone 4 according to the present invention. When one of the users using the shared cellular phone 4 performs the operation of origination by means of the operation unit 19, this sequence is started.

In the shared cellular phone 4, the control unit 11 takes in a list of user information from the user information storage unit 16 and makes the display unit 18 display the list of user information, and the user selects user information by means of the operation unit 19 in case a plurality of users are registered to determine a phone number of thus selected user information as a phone number of the origination source (T71). In case one item of user information is registered in the user information storage unit 16, the control unit 11 determines a phone number of registered user information as a phone number of the origination source. Next, in the shared cellular phone 4, when the user directly inputs a phone number or the user selects intended-party's information in the intended-party's information storage unit 17, the operation unit 19 determines a phone number of the destination being a phone number of the intended-party's phone 2 (T72). Next, in the shared cellular phone 4, the control unit 11 notifies the base station 3 of origination using a phone number of the origination source and a phone number of the destination (T73). Next, the base station 3 notifies the intended-party's phone 2 of incoming of a call in accordance with a phone number of the destination (T81). Next, when the user of the intended-party's phone 2 performs the off-hook operation, the intended-party's phone 2 notifies the base station 3 of the off-hook operation, and talking on the phone is started (T82), and the sequence is ended.

Under above-described operation, a plurality of users can use the shared cellular phone 4 using their respective phone numbers. Furthermore, when a user comes close to the shared cellular phone 4 with the personal cellular phone 6 carried about thereby, the user comes to be able to use the shared cellular phone 4. Moreover, when a first user who used the shared cellular phone 4 hands over the shared cellular phone 4 to a second user, the second user comes to be able to use the shared cellular phone 4 with the second user's phone number.

For example, when the radius of the short-range radio communication area 5 is set to be several meters, a user of the personal cellular phone 6 who is located in a specific room comes to be able to use the shared cellular phone 4. On the other hand, when the radius of the short-range radio communication area 5 is set to be dozens of centimeters, only a user of the personal cellular phone 6 who is located in close proximity to or has the shared cellular phone 4 comes to be able to use the shared cellular phone 4. The size of the short-range radio communication area 5 can be made adjustable.

In the embodiment, as a shared phone, a cellular phone is employed. On the other hand, as a shared phone, a fixed phone may be employed. In the embodiment, a personal cellular phone is employed. On the other hand, a device that can perform short-range radio communication and can transmit user information stored in advance to a shared phone, such as a PDA (Personal Digital Assistant), IC tag, etc. may be employed. Furthermore, in the embodiment, the shared cellular phone 4 takes in user information from outside using the short-range radio communication unit 14 and resisters thus taken in user information to the user information storage unit 16. On the other hand, the user information may be registered to the user information storage unit 16 from the operation unit 19, in which case the short-range radio communication unit 14 may be omitted.

Furthermore, a program that makes the above-described steps be executed in a computer configuring a shared phone can be provided as a shared phone control program. When being stored in a recording medium which is readable by a computer, the above-described program can be executed by a computer configuring a shared phone. The recording medium which is readable by a computer may be an internal storage or a ROM, a RAM, etc. that is internally arranged in a computer, a mobile storage medium or a CD-ROM, a flexible disc, a DVD disc, a magneto optical disc, an IC card, etc., a database that has retained therein a computer program, or other computers and their database, and may further include a transmission medium on a line.

An intra-area radio communication unit corresponds to the short-range radio communication unit 14 in this embodiment. A user information storage step corresponds to the processing T13 in this embodiment. A phone number registration step corresponds to the processing T21 in this embodiment. An incoming call detection step corresponds to the processing T52 in this embodiment. A display step corresponds to the processing T63, T71, T72 in this embodiment. An operation step corresponds to the processing T63, T71, T72 in this embodiment. A user information take-in step corresponds to the processing T11, T12 in this embodiment. A user information deletion step corresponds to the processing T33 in this embodiment. A user information transmission step corresponds to the processing T12 in this embodiment.

I claim:

1. A method which is executed by a system including a first communication device and a second communication device, for registering user information of the second communication device in a base station, the method comprising:
   causing the first communication device to detect that the second communication device is located in a predetermined area;
   causing the first communication device to transmit a request for user information to the detected second communication device by radio communication;
   causing the second communication device to transmit the user information to the first communication device by radio communication based on the request; and
   causing the first communication device to transmit a registration request for the transmitted user information to the base station by radio communication.

2. The method according to claim 1, further comprising causing the first communication device to notify the base station of an off-hook operation in response to an operation by a user when the first communication device receives a notification of an incoming call from the base station.

3. A communication system comprising:
   a first communication device; and
   a second communication device, wherein
   the first communication device includes:
      a first transmission unit that transmits a request for user information to the second communication device by radio communication when the first communication device detects that the second communication device is located in a predetermined area, and
      a second transmission unit that transmits a registration request for the user information which is transmitted from the second communication device in response to the request for the user information, to a base station by radio communication, and
   the second communication device includes
      a third transmission unit that transmits the user information to the first communication device by radio communication in response to the request for user information.

4. The system according to claim 3, wherein the second transmission unit notifies the base station of an off-hook operation in response to an operation by a user when the first communication device receives a notification of an incoming call from the base station.

* * * * *